J. A. CONWAY.
Flower-Pot.

No. 209,798.  Patented Nov. 12, 1878.

WITNESSES—
J. D. Cook

INVENTOR—
John A. Conway

UNITED STATES PATENT OFFICE.

JOHN A. CONWAY, OF TOLEDO, OHIO.

IMPROVEMENT IN FLOWER-POTS.

Specification forming part of Letters Patent No. 209,798, dated November 12, 1878; application filed October 26, 1878.

*To all whom it may concern:*

Be it known that I, JOHN A. CONWAY, of Toledo, in the county of Lucas and State of Ohio, have invented a new and useful Improvement in Flower Pots or Vases, which improvement is fully set forth in the following specification, reference being had to the accompanying drawings, of which—

Figure 1:
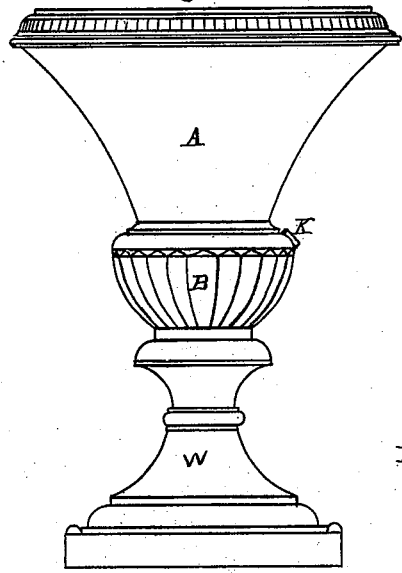
Figure 2:
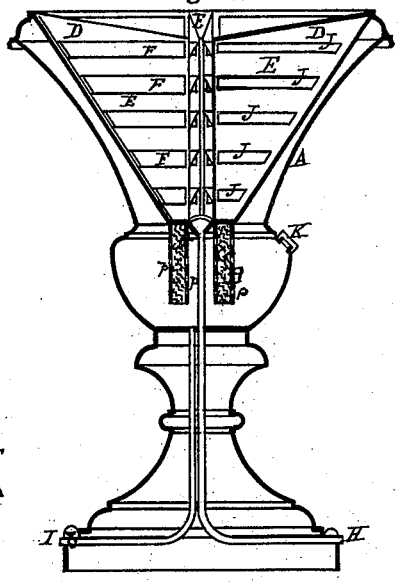
Figure 5:
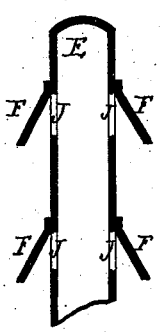
Figure 3:
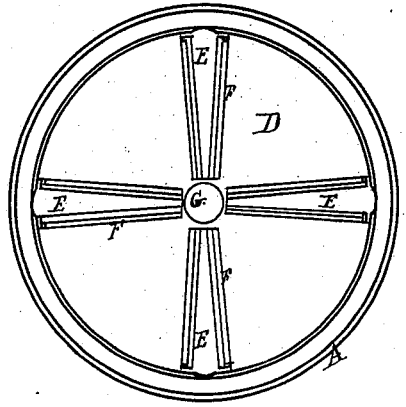
Figure 6:
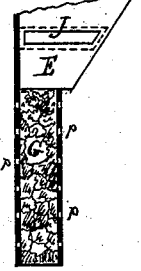
Figure 4:
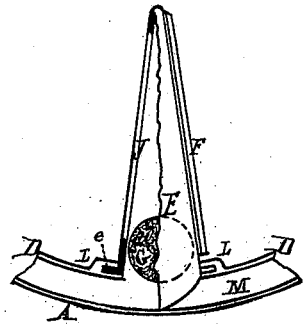

Figure 1 is an elevation; Fig. 2, a sectional elevation, showing converging wings and openings for the passage of moisture, together with earth-guards for preventing the earth from entering the water-chamber. Fig. 3 is a plan showing relative position of wings to each other and to the other parts. Fig. 4 is an enlarged plan of one wing. Fig. 5 is an enlarged section, showing openings and guard-flanges. Fig. 6 is a section of lower part of wing, showing perforated tubes.

The object of this invention is to irrigate the earth in vase by capillary attraction, reference being had to my application filed September 27, 1877, for which Letters Patent No. 197,765, and dated December 4, 1877, were granted.

The object of my improvement on said original invention is to facilitate a more thorough and uniform irrigation throughout the entire inner area of the vase by substituting in lieu of perforated plates L, with protections F and N, in original invention, the wings or auxiliary vapor-chambers E, extending from the vapor-chamber E, described in original invention, to or near the center, and from the bottom to near the surface of earth in the vase. These wings may be made movable or be permanently fastened to the inner shell of vapor-chamber, and be provided with slots or other openings J J and with earth-guards F F.

At the bottom of the earth-pot D, and directly under the wings E, are placed perforated tubes G, having evaporating-openings p p. These tubes are to extend well down into water-chamber B and be filled with sponge or other suitable absorbent, for the purpose of keeping a constant supply of water at the bottom of the earth-pot and vapor-chambers.

The bottom or under area of wings E, and also the upper and lower ends of tubes G, are to be left open to facilitate the free passage of moisture from the water to and into the wings E, thence through openings J, permeating and uniformly irrigating the entire volume of earth in chamber D.

The number and size of wings are to be regulated by the quantity of earth and size of vase.

I claim as my invention—

The auxiliary vapor-chambers or wings E and perforated tubes or pipes G, substantially as described, as an improvement on the original invention, as above set forth.

JOHN A. CONWAY.

Witnesses:
 J. D. COOK,
 G. W. MERRILL.